RINGING EQUIPMENT

Filed Oct. 8, 1947 2 SHEETS—SHEET 1

INVENTORS
WALTER BRANDT
JOHN H. BRUNDAGE
BY
Robert Harding Jr.
ATTORNEY

May 20, 1952 | W. BRANDT ET AL | 2,596,977

RINGING EQUIPMENT

Filed Oct. 8, 1947 | 2 SHEETS—SHEET 2

INVENTORS
WALTER BRANDT
JOHN H. BRUNDAGE

BY Robert Harding Jr
ATTORNEY

Patented May 20, 1952

2,596,977

UNITED STATES PATENT OFFICE 2,596,977

RINGING EQUIPMENT

Walter Brandt, Jersey City, and John H. Brundage, West Caldwell, N. J., assignors to International Standard Electric Corporation, New York, N. Y., a corporation of Delaware Application October 8, 1947, Serial No. 778,676

15 Claims. (Cl. 179—84)

This invention relates to telecommunication signaling systems. More particularly, it relates to an improved apparatus for translating ringing signals transmitted as modulations of a carrier in the speech frequency range into low frequency or direct current ringing signals or for doing the converse.

It is well known to transmit ringing signals as modulations of a speech frequency carrier for part of the distance between stations of origin and destination. It is the pratice where this is done to complete transmission over the remainder of the distance with direct current or low frequency ringing signals, and in order to do this, to employ means ahead of the carrier channel for converting low frequency or direct current signals into carrier borne modulations and means after that channel to reconvert the modulations back into low frequency or direct current signals.

An advantage in a system employing carrier borne ringing signals in the voice frequency range is that the ringing signals can conveniently pass through repeaters and other components which are adapted to operate at voice frequencies.

A disadvantage of this type of system is that the means for converting and reconverting complicate the apparatus, adding to the expense of installation and maintenance. It is usually the practice to use at the input end of a transmission link intended to carry both actual speech frequencies and carrier borne ringing signals in the speech frequency range, separate vacuum tube oscillators for producing respectively the carrier and the low frequency modulating signals and to use a modulating tube for mixing them. Likewise it is general practice to use at the output end an amplifier with its circuits tuned to the carrier and another amplifier with its circuits tuned to the modulating frequency (for amplification after detection). Moreover, since transmissions take place in both directions (each terminal of the channel is both an input end and an output end), besides the separate oscillators and the modulator, the separate amplifiers as well are needed for each of the terminals and the total amount of equipment becomes considerable. For economy some circuits have been adapted to be switched from one arrangement to another to permit predetermined tubes to perform alternate functions such as amplifying or oscillating. However, the amount of such simplification has been quite limited.

It is an object of the present invention to devise apparatus wherein a single tube can serve simultaneously to amplify both voice frequency carrier borne signals and the modulating component thereof obtained by detection.

It is a further object of the present invention to devise apparatus wherein a single tube can serve simultaneously to generate voice frequency carrier oscillations and low frequency modulating oscillations and to mix the two to produce carrier borne ringing signals.

It is a further object of the present invention to devise apparatus wherein a single tube, which can simultaneously amplify both high and low frequency signals, can have its circuits rearranged by a switching operation so that simultaneously it can generate carrier oscillations and modulating oscillations and can mix the two to produce carrier borne control signals.

Other objects, features and advantages of this invention will be apparent to those skilled in the art from the following description of an embodiment of this invention and from the drawing, in which.

Figure 1:
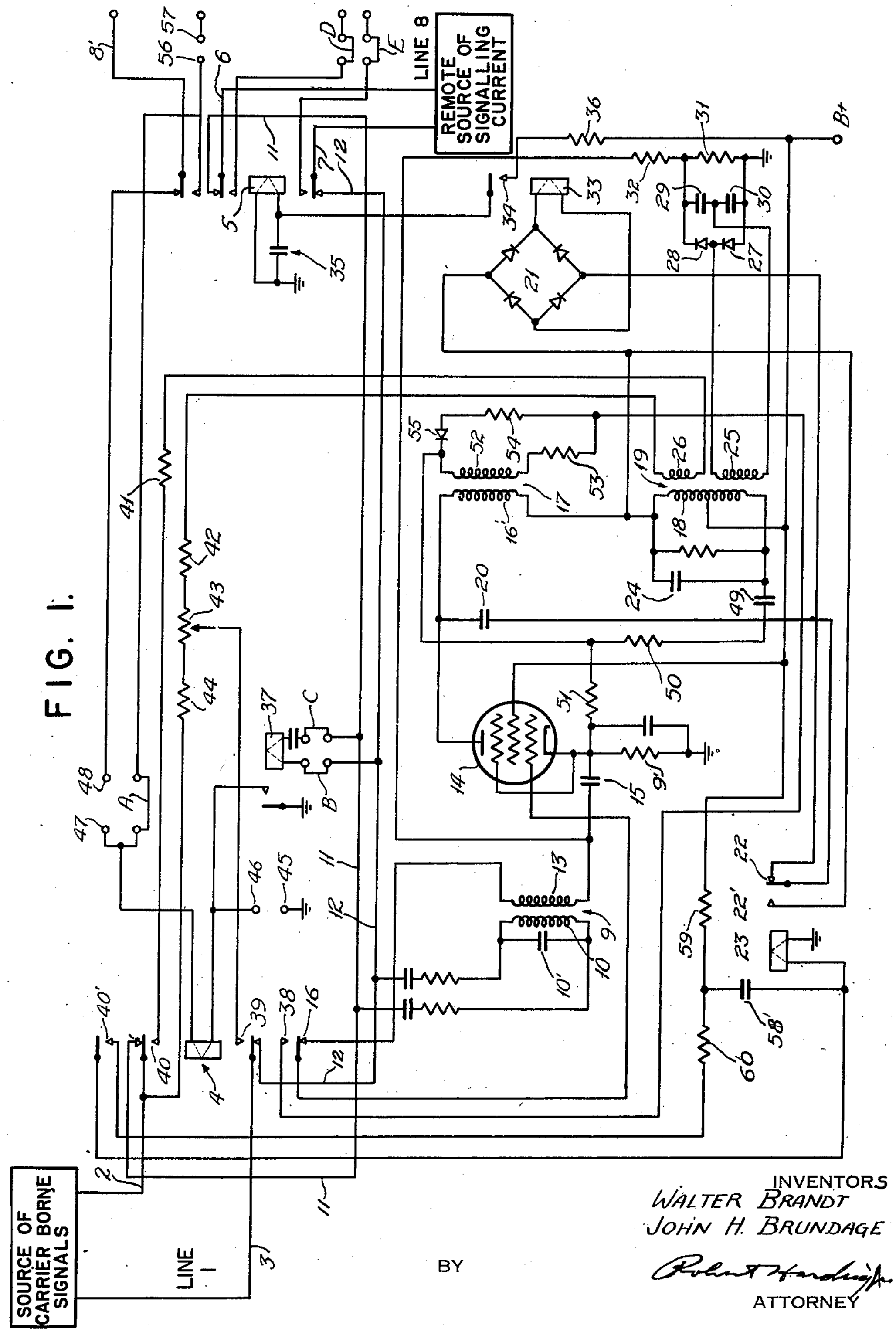
Fig. 1 is a diagrammatic representation of apparatus according to this invention.

Transmission line of Fig. 1, or first line, is a line for carrying voice currents. It comprises conductors 2 and 3 which normally are extended through back contacts of relay 4, link conductors 11 and 12, and back contacts of relay 5 to the speech conductors 6 and 7 of another, or second, line 8, which may include a signaling wire 8'.

A transformer 9 has its primary, consisting of winding 10 and condenser 10' bridged across link conductors 11 and 12. Each end of winding 10 is connected to one of the link conductors through a blocking condenser and a current limiting resistor.

The blocking condensers are for keeping direct current and low frequency signals from reaching transformer 9 at any significant level. The values of the limiting resistors should be large enough to keep bridging losses at a minimum, i. e. so that the input impedance of transformer 9 will be high at all frequencies, and to minimize cross talk effects by reducing the sensitivity of the ringer.

The primary of transformer 9 is tuned to the voice frequency carrier employed for transmitting carrier borne ringing signals over line 1. Secondary 13 is electrically connected between the control grid and the cathode of a multi-electrode tube 14 which may be pentode. More specifically, one end of secondary 13 is connected to the tube cathode through condenser 15 while the other end is connected to its control grid through a rest contact 16 of relay 4. Thus when relay 4 is inoperative carrier borne ringing signals in a band having its center at the resonant frequency of the primary of transformer 9 will reach the input of tube 14.

Though transient speech frequencies which correspond to the tuning of the primary of transformer 9 will reach the input of tube 14 they will not operate the apparatus to ring outgoing line 8. For operation of the apparatus it is necessary that the carrier borne signal (carrier and side bands) be within the pass-band of transformer 9; that the modulating signal which is separated out by detection be of a predetermined frequency; and that the signal persist for at least a predetermined time.

The screen grid of tube 14 is connected to a source of energizing potential (B+) and its suppressor grid is connected to the cathode. The anode is energized from a source of potential (which may be the same one, B+) through the primary winding 16′ of a transformer 17 and through a portion of the primary winding 18 of a transformer 19. The primary of transformer 17 is tuned by condenser 20 to the low frequency corresponding to that used for modulating the speech frequency carrier received over line 1, for example, 19⅙ cycles per second. Primary 16′ is a parallel tuned circuit and well known hereinafter as the second anti-resonant circuit. It is conventional except for the fact that one of the two connections between its condenser 20 and primary winding 16′ normally includes bridge rectifier 21, i. e. when relay 23 is inoperative. Rectifier 21 is normally connected into this anti-resonant circuit in series with its two reactive elements but when relay 23 is operated the rectifier is replaced by a copper connection over a front contact of this relay. Even though primaries 16′ and 18 are turned to different frequencies it is possible for both of them to be resonant at the same time as a result of energy supplied to both of them by the same tube. Tuned primary 16′ interconnects primary 18 and tube 14. Therefore, its capacitive branch will afford a low impedance pathway from tube 14 to primary 18 for the relatively high carrier and side band frequencies. Primary 18 is tuned by condenser 24 to the same frequency as tuned primary 10 of transformer 9 and is known hereinafter as the first anti-resonant circuit. For example, it may be tuned to 1,000 cycles per second. Obviously, the band width of primary 18 and the pass-band of transformer 9 should be sufficient to accommodate the modulation products. If 19⅙ oscillations are used for modulation the band width should be about 40 cycles wide.

It is obvious that from the foregoing when a carrier borne ringing signal is received by tube 14 from line 1 through the link conductors and through transformer 9 it will appear in amplified form in tuned circuit 18. Transformer 19 has two secondaries 25 and 26. Secondary 25 is connected to the input of a voltage doubler detector circuit employing two non-linear devices connected in series. In the embodiment shown these devices are dry rectifiers 27 and 28. A circuit, comprising two condensers 29 and 30, connected in series, is connected parallel to the series circuit of the two devices as well as in parallel to a resistor 31. One end of secondary 25 is connected to the juncture between the two devices and the other end is connected to the juncture between condensers 29 and 30. The condensers will be charged alternately but in the same direction by the alternating currents in secondary 25 and the combined voltage across the two of them will appear across resistor 31. One end of resistor 31 is grounded and the other end is connected to the cathode of tube 14 through resistor 32 and condenser 15, which have values for preventing self-oscillation of tube 14 at the carrier frequency due to feedback over this connection. However, the detected low frequency components of the signal originally received from line 1 and amplified in tube 14 are effectively applied back to the input of tube 14 via resistor 9′ and condenser 15. This is due to the fact that the voltage drop across resistor 32 for voltages of low frequency or for direct current voltages will be very small. The output of the detector (which may also be called the demodulator) will include a direct current component as well as the low frequency modulating signal. Rectifiers 27 and 28 should be so poled and secondary 25 should be so wound that the polarity of the direct current component applied to the cathode will be positive. In this way the grid to cathode bias will go more negative when the signal strength is high so that the amplification factor of the tube will be automatically adjusted to prevent overloading.

Since primary 16′ of transformer 17 is tuned to the low frequency used for modulating the carrier and since the low frequency anode current is afforded a low impedance return to ground through the primary coil of transformer 19, the low frequency signal fed back to the input of tube 14 from the detector will appear in amplified form in tuned circuit 16′.

Unidirectional portions of the large surge currents moving in primary 16′ will pass freely through the branches of bridge rectifier 21 and through relay 33 which is connected across its output terminals. Relay 33 will be operated by the pulsed direct current thus provided and will close its front contact 34 to apply a source of voltage (which may be the high voltage source B+) to one end of the winding of relay 5, the other end of which is already grounded. Condenser 35 is connected in parallel to the winding of relay 5 and, therefore, short circuits it transiently while the condenser is being charged and delays the operation of the relay. Resistor 36 is connected between relay 5 and the source of energy for operating it. The value of this resistor is selected for delaying the charging of condenser 35 so that it will not reach the level at which the relay can operate until a predetermined period of time has elapsed. Therefore, relay 5 will only operate when relay 33 continues to be energized for that predetermined time. This will prevent spurious operation of relay 5 (via relay 33 and tube 14) in response to line transients and/or speech components corresponding in frequency to the carrier.

When relay 5 is energized a source of low frequency signaling current is connected over two of its front contacts to conductors 6 and 7 of line 8. Thus, the apparatus will have translated a carrier borne ringing signal into the application of a low frequency ringing current to the conductors of the outgoing line. Where it is desired to cause ringing with direct current energy over the signaling wire of line 8 this will be accomplished via another front contact of relay 5 provided a jumper strap is connected across an opening in the connection between relay 5 and a source of direct potential (−24 volts) at the location of the terminals 56 and 57. However, when this is done it will be necessary to remove jumpers D and E so that 20 cycle current will not be applied to conductors 6 and 7 through relay 5.

Therefore, it is seen that in the normal, or first, condition of this tube 14 with the cooperation of its associated circuits will amplify the carrier borne ringing signals received from line 1 and also will amplify the modulating frequency thereof obtained by detection.

The circuits associated with tube 14 are rearranged by the operation of relay 4 so that the tube will have a new group of simultaneous functions. Relay 4 can be operated directly by a direct current ringing signal arriving via the signaling wire of line 8 and the rest contact of relay 5, or it may be operated indirectly by a low frequency ringing current arriving via conductors 6 and 7, rest contacts of relay 5, link conductors 11 and 12, and relay 37. Though relay 37 is permanently bridged across link conductors 11 and 12 and through it is adapted to be energized by ringing currents of predetermined large magnitude and low frequency (originating from a remote source, not shown, which is connected to conductors 6 and 7), it will not respond to the carrier borne ringing signals or to speech signals incoming over line 1. To this end the self-inductance of its winding should be high to speech frequencies. For operation of relay 4 by low frequency ringing currents over conductors 6 and 7 each of the jumper straps A, B and C should be in position as shown in Fig. 1. When relay 37 is energized it acts to ground one end of the coil of relay 4 while the other end is already connected to a source of potential (−24 volts). For operation of relay 4 by direct current over the signal wire of line 8 straps A, B and C should be removed and jumper straps should be bridged across terminals 45 and 46, and 47 and 48, respectively.

The connection of the control grid of tube 14 will be shifted upon operation of relay 4, from its rest contact 16 to its front contact 38. This will disconnect the grid of tube 14 from transformer 9 and will connect it to the secondary of transformer 17 to provide a low frequency feedback path from the anode circuit of device 14 to its input. At the same time lines 2 and 3 will be disconnected from link conductors 11 and 12 and will be connected over front contacts 39 and 40 to an output circuit of device 14, comprising the secondary 26 of transformer 19 and a voltage dividing network including resistors 41, 42, 43 and 44. Resistor 43 is shown to have a movable tap to permit control of the voltage level of the output of tube 14 fed to line 1.

At its front contact 40′ relay 4 completes a connection between a source of potential (which may be the source B+) and relay 23. Relay 23 thereupon acts to take bridge rectifier 21 out of the circuit of tuned primary 16′ and to replace it with a direct connection via front contact 22′.

Switching transients arising at contact 38 when relay 4 is operated will be sufficient to start oscillations in tube 14. Thereafter tube 14 will act simultaneously as a generator of voice frequency carrier oscillations and of low frequency modulating oscillations and as a modulator for mixing these two kinds of oscillations.

Tuned primary 18 which, as has already been described above, is responsive to carrier frequency energy in the anode circuit of tube 14, is connected back to the cathode of the tube through a condenser 49 and two resistors 50 and 51. Since the high voltage source normally will be by-passed and will have its negative terminal grounded, it is obvious that the center top of the primary of transformer 19 will be grounded to carrier frequency oscillations. Therefore, the potentials at the ends of the primary will vary at the carrier frequency with respect to ground. A selected one of these ends is connected to the cathode of tube 14 for providing positive feedback to sustain oscillations.

The low frequency component of the anode current of tube 14 will sustain oscillations in tuned primary 16′ if positive feedback is provided to the tube, and, if such is the case, the secondary 52 of transformer 17 will have an oscillating voltage inducted across its ends. Positive feedback of low frequency energy is provided as follows: A series circuit including two resistors 53 and 54 and a rectifier 55 are connected in shunt across secondary 52. They comprise in effect a voltage dividing network having unequal characteristics in opposite directions. One point of this voltage dividing circuit is connected to the cathode of tube 14 through a resistor 51 while another point thereof is connected to the control grid via front contact 38 of relay 4. This positive feedback path for low frequency oscillations becomes part of the circuit of tube 14 at times when relay 4 is operated.

The values of resistors 53 and 54 and of rectifier 55 are selected so that the low frequency oscillations cause tube 14 to be blocked for approximately one-half of each low frequency cycle. This will result in intermittent carrier frequency oscillations. An output signal will be available in secondary 26 of transformer 19 which consists of the carrier frequency interrupted at the modulating frequency rate, i. e. the desired carrier borne ringing signal. As has already been explained above, this is fed through front contacts 40 and 39 of relay 4 into line 1 via an attenuating network.

Thus this apparatus in its second condition when relay 4 is operated, is responsive to either direct current or low frequency ringing currents to generate a carrier and a modulating frequency; to modulate the carrier with the modulating frequency; and to transmit carrier borne frequency signals out over a line 1—all with the use of a single vacuum tube.

It follows from the foregoing that when ringing current ceases to be applied over line 8 relay 4 will be released and bridge rectifier 21 will be connected back into the circuit of tuned primary 16′. Since the oscillations in primary 16′ will take a little time to die out, it is desirable to interpose a small delay before rectifier 21 is connected back into the circuit. For this reason the energizing circuit of relay 23 contains a network comprising condenser 58 and resistors 59 and 60 connected in a conventional manner to delay the release of relay 23.

Figure 2:
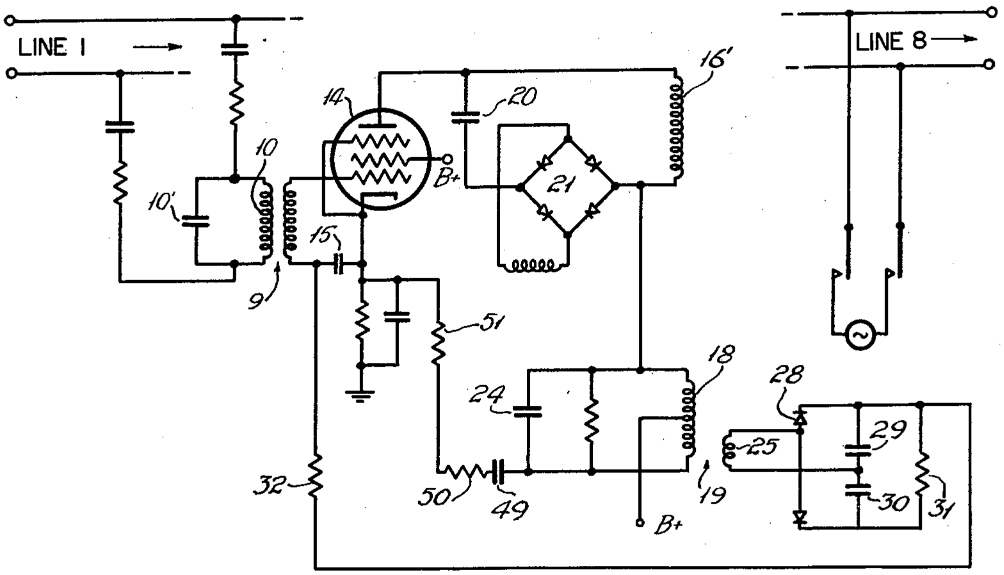
Fig. 2 is a simplified diagram of the apparatus of Fig. 1 showing the circuit arrangement of a vacuum tube thereof at times when it operates simultaneously as a high frequency and low frequency amplifier.
Figure 3:
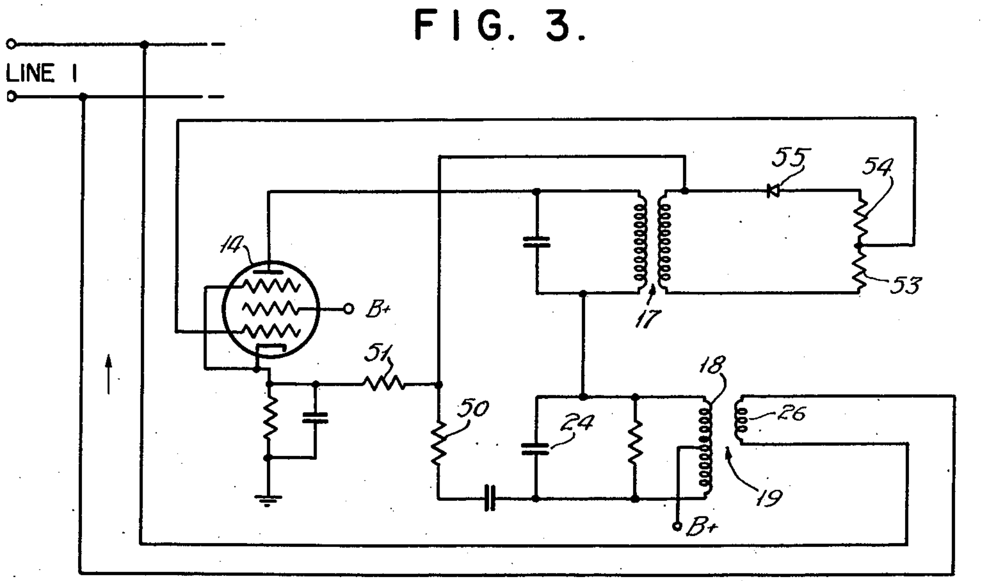
Fig. 3 is a simplified diagram of the apparatus of Fig. 1 showing the circuit arrangement of a tube thereof at times when it operates simultaneously as a dual oscillator and mixer.

In both Figs. 2 and 3 two anti-resonant circuits are shown connected in series between the anode of tube 14 and the source, B+. In Fig. 2, however, one group of additional circuit elements is shown. These additional circuit elements are included for selectively applying carrier borne ringing signals from line 1 to the tube input; for detecting the modulating component of the amplified carrier borne signals and applying it back to the tube input; for rectifying the amplified modulating component and operating a relay with the resulting direct current pulses; and for applying low frequency signaling current to line 2 in response to the operation of the relay. On the other hand another group of elements is shown in Fig. 3 for providing positive feedback from the two anti-resonant circuits to the tube input and for withdrawing the modulated carrier ringing signals thus generated and applying it to line 1. Fig. 2 thus represents operative portions of the apparatus of Fig. 1 in its condition when relay 4 is de-energized while Fig. 3 represents operative portions thereof when relay 4 is energized.

In the example used herein, apparatus according to the present invention is shown as used for translating ringing signals from one form to another. However, it is obvious that similar apparatus according to this invention could be employed for translating any of a wide variety of other control signals from one form to another.

Similarly, though the embodiment shown herein is adapted to process or generate carrier borne signals in which the carrier is in the speech frequency range, it is obvious that the apparatus according to the present invention can be employed for a corresponding system in which a carrier borne channel is in an entirely different frequency range.

In the embodiment shown herein a pentode tube is shown. However, it is obvious that the principle of this invention can be applied to any of a wide variety of tubes.

It is likewise obvious that there are numerous circuit details in the shown embodiment which can be replaced by known circuit equivalents without changing the essential nature of the apparatus, for example, the detecting circuit in the form shown may be modified to use diodes instead of dry rectifiers, or an entirely different detecting circuit, which need not necessarily be of the voltage doubler type, may be used. Similarly the feedback arrangements can be somewhat altered according to well known engineering practices without changing the basic arrangement of the circuit in its condition when relay 40 is operated.

What is claimed is:

1. In a telecommunication system, first and second lines for transmitting speech frequencies, a source of carrier borne signals in the speech frequency range, means for applying the carrier borne signals to the first line, a remote source of signaling current in the low-to-zero frequency range, means for applying the signaling current to the second line, a local source of signaling current in the low-to-zero frequency range, apparatus responsive in a first condition to carrier borne signals received from the first line for applying the signaling currents from the local source to the second line, a portion of the same apparatus in a second condition being adapted to generate both carrier and modulating signals and means responsive to signaling currents received over the second line from the remote source to change said apparatus from said first condition to said second condition and to apply said last-mentioned carrier signals to the first line.

2. In a telecommunication system, first and second lines for transmitting speech frequencies, a source of carrier borne signals in the speech frequency range, means for applying the carrier borne signals to the first line, a remote source of signalling current in the low-to-zero frequency range, means for applying the signalling current to the second line, a local source of signalling current in the low-to-zero frequency range, apparatus having two conditions of operation, said apparatus in a first condition of operation being adapted to amplify and detect said carrier signals and to amplify said carrier borne signals and being adapted in a second condition to generate both carrier and modulating signals and to modulate said last-mentioned carrier signals with said last-mentioned modulating signals, means connected to said apparatus and responsive to said carrier borne signals for applying the signal currents from said local source to the second line, and means responsive to signalling currents received over the second line from the remote source to change said apparatus from said first condition to said second condition and to apply said modulated carrier signals to the first line.

3. In a telecommunication system, first and second lines for transmitting speech frequencies, a source of carrier borne signals in the speech frequency range, means for applying the carrier borne signals to the first line, a remote source of signalling current in the low-to-zero frequency range, means for applying the signalling current to the second line, a local source of signalling current in the low-to-zero frequency range, apparatus responsive to carrier borne signals received from the first line for applying the signalling currents from the local source to the second line and responsive to signalling currents received over the second line from the remote source to generate carrier borne signals and to apply them to the first line, said apparatus including a vacuum tube, means for separating said carrier borne signals from said carrier signals, said vacuum tube being connected to said separating means and operating in a first condition to amplify said carrier borne signals and operating in a second condition to generate both carrier and modulating signals and to modulate said last-mentioned carrier signals with said modulating signals.

4. Electrical signal processing apparatus comprising a vacuum tube including a cathode, a grid and an anode, a source of modulated carrier signals comprising carrier electrical energy modulated by modulating signals of predetermined frequency, means for applying the modulated carrier signals to the tube between the cathode and grid, a first anti-resonant circuit tuned to the frequency band covered by the modulated carrier signals, a second anti-resonant circuit tuned to said predetermined frequency, a source of energizing potential, means for connecting the first and second anti-resonant circuits and the source of potential in series between the anode and the cathode, detector means for withdrawing signal energy from the first anti-resonant circuit and separating said modulating signals therefrom, means for applying said modulating signals from the detector means to the tube between the grid and the cathode, and means for withdrawing low frequency energy from the second anti-resonant circuit.

5. Electrical signal processing apparatus as in claim 4, in which the means for withdrawing low frequency energy from the second anti-resonant circuit comprises a direct current operated device and a rectifier connected in series with the reactive elements forming the anti-resonant circuit.

6. Electrical signal processing apparatus as in claim 4, in which the means for withdrawing low frequency energy from the second anti-resonant circuit comprises a bridge rectifier connected in series with the reactive elements of the anti-resonant circuit and a direct current operated device connected across the output terminals of the bridge rectifier.

7. A dual oscillator comprising a vacuum tube including a cathode, a grid and an anode, a first anti-resonant circuit tuned to a predetermined carrier frequency, a second anti-resonant circuit tuned to a predetermined modulating frequency, a source of energizing potential, means for connecting the first and second anti-resonant circuits and the source of potential in series between the anode and the cathode, means for supplying positive feedback to the tube between its control grid and cathode from each of the resonant circuits, the means for supplying feedback between said second resonant circuit and said control grid and cathode comprising a rectifier and an impedance direct current connected to said control grid and cathode, the polarity of said rectifier and the values of said rectifier and impedance being so chosen that said tube is blocked during substantially one half of each modulating frequency cycle, and means for withdrawing modulated carrier electrical energy from the first anti-resonant circuit.

8. Apparatus for processing electrical signals when the apparatus is in a first condition and for generating modulated carrier electrical energy when it is in a second condition, comprising a vacuum tube including a cathode, a grid and an anode, a source of electrical signals, comprising modulation products of a carrier and a modulating signal, a first anti-resonant circuit tuned to the frequency of the carrier, a second anti-resonant circuit tuned to the frequency of the modulating signal, a source of energizing potential, means for connecting the first and second anti-resonant circuits and the source of potential in series between the anode and the cathode, switching means for changing over the arrangement of the apparatus between a first condition and a second condition, means for applying the signals to the tube between the cathode and the grid when the apparatus is in the first condition, detector means for withdrawing signal energy from the first anti-resonant circuit and demodulating it when the apparatus is in the first condition, means for applying the demodulation products from the detector means to the tube between the grid and the cathode when the apparatus is in the first condition, means for withdrawing energy from the second anti-resonant circuit when the apparatus is in the first condition, means for supplying positive feedback to the tube between its grid and cathode from each of the resonant circuits when the apparatus is in the second condition, and means for withdrawing modulated carrier electrical energy from the first anti-resonant circuit when the apparatus is in the second condition.

9. Apparatus for processing electrical signals as in claim 8, in which the means for supplying positive feedback comprises a coil inductively coupled to the second anti-resonant circuit, voltage dividing means including a non-linear element connected across the coil, and means for connecting a selected point on the voltage dividing means to the tube for intermittently blocking the tube.

10. The apparatus for processing electrical signals as in claim 8 in which a detector means comprises a voltage-doubler detector circuit including two dry rectifiers.

11. Apparatus for processing electrical signals as in claim 8, in which the means for withdrawing energy from the second anti-resonant circuit comprises a bridge rectifier connected in series with the reactive elements of the anti-resonant circuit and a direct current operated device connected across the output terminals of the bridge rectifier.

12. In a telecommunication system, first and second lines for transmitting speech frequencies, a source of carrier borne signals in the speech freequency range, means for applying the carrier borne signals to the first line at a remote point, a remote source of signaling current in the low-to-zero frequency range, means for applying the signaling current to the second line, a local source of signaling current in the low-to-zero frequency range, apparatus responsive in a first condition to carrier borne signals received over the first line for applying signaling current from the local source to the second line and responsive in a second condition to signaling current received over the second line to generate carrier borne signals and to apply them to the first line, in which the apparatus comprises a vacuum tube including a cathode, a grid and an anode, a first anti-resonant circuit tuned to the carrier frequency of the carrier borne signals, a second anti-resonant circuit tuned to the modulating frequency of the carrier borne signals, a source of energizing potential, means for connecting a first and second anti-resonant circuits and the source of potential in series between the anode and the cathode, switching means responsive to signaling currents received over the second line from the remote source for changing over the arrangement of the apparatus from the first condition to the second condition, means for applying carrier borne signals from the first line to the tube between its cathode and grid when the apparatus is in the first condition, detector means for withdrawing signal energy from the first anti-resonant circuit and demodulating it when the apparatus is in the first condition, means for applying the demodulation products from the detector means to the tube between its grid and cathode when the apparatus is in the first condition, means for withdrawing energy from the second anti-resonant circuit when the apparatus is in the first condition, relay means operable by energy withdrawn to apply signaling current from the local source to the second line, means for supplying positive feedback to the tube between its grid and cathode from each of the resonant circuits when the apparatus is in the second condition, and means for withdrawing modulated carrier electrical energy from the first anti-resonant circuit when the apparatus is in the second condition and for applying this energy to the first line.

13. In a telecommunication system as in claim 12, and in which the apparatus includes means for delaying the operation of the relay means until energy has been withdrawn from the second circuit for a predetermined period of time.

14. In a telecommunication system as in claim 12, in which the means for applying carrier borne signals to the tube comprises a selective circuit tuned to the frequency band of the signals.

15. In a telecommunication system as in claim 12, in which the switching means comprises means for delaying the withdrawing of energy from the second anti-resonant circuit each time that the apparatus is changed over from its second condition to its first condition for a sufficient period of time to permit substantial decay of oscillations in the second tuned circuit.

WALTER BRANDT.
JOHN H. BRUNDAGE.

REFERENCES CITED

The following references are of record in the file of this patent:

UNITED STATES PATENTS

| Number | Name | Date |
|---|---|---|
| 1,860,050 | Osnos | May 24, 1932 |
| 1,932,679 | Ryall | Oct. 31, 1933 |
| 1,956,353 | James | Apr. 24, 1934 |
| 2,036,079 | Pullis | Mar. 31, 1936 |
| 2,059,587 | Klotz | Nov. 3, 1936 |
| 2,263,139 | Parker | Nov. 18, 1941 |
| 2,288,486 | Rivlin | June 30, 1942 |
| 2,355,642 | Gose | Apr. 15, 1944 |

FOREIGN PATENTS

| Number | Country | Date |
|---|---|---|
| 541,087 | Germany | Jan. 6, 1932 |